United States Patent [19]

Ikeda

[11] 4,190,503
[45] Feb. 26, 1980

[54] METHOD OF MANUFACTUREING A RECORD MATRIX

[75] Inventor: Jiro Ikeda, Fujieda, Japan

[73] Assignee: Sony Corporation, Tokyo, Japan

[21] Appl. No.: 972,237

[22] Filed: Dec. 22, 1978

[30] Foreign Application Priority Data

Dec. 28, 1977 [JP] Japan .................... 52/160613
Oct. 19, 1978 [JP] Japan .................... 53/128748

[51] Int. Cl.² .................... C25D 1/10; C25D 1/20;
C23C 3/02; C23C 7/00
[52] U.S. Cl. .................... 204/5; 106/1.27;
427/306; 427/426
[58] Field of Search .................... 204/5, 6, 38 B;
427/426, 427, 430 A, 438, 306; 106/1.27, 1.12, 1.05

[56] References Cited

U.S. PATENT DOCUMENTS

| | | | |
|---|---|---|---|
| 2,075,646 | 3/1937 | Hewitt | 204/5 |
| 2,822,294 | 2/1958 | Gutzeit | 427/438 |
| 2,837,445 | 6/1958 | Talmey | 106/1.27 |
| 2,956,900 | 10/1960 | Carlson | 106/1.27 |
| 3,672,939 | 6/1972 | Miller | 427/168 |
| 3,674,517 | 7/1972 | Miller | 106/1.22 |
| 3,723,155 | 3/1973 | Greenberg et al. | 427/160 |
| 3,723,158 | 3/1973 | Miller | 428/432 |

*Primary Examiner*—T. M. Tufariello
*Attorney, Agent, or Firm*—Lewis H. Eslinger; Alvin Sinderbrand

[57] ABSTRACT

In manufacturing a record matrix from a lacquer master having a sound groove in a surface thereof, a basic reduction solution containing borohydride compound and an acidic metal salt solution containing nickel salt, ammonium salt and lactic acid are sprayed against the surface of the master having the sound groove for effecting the electroless plating thereon of a nickel surface metal layer having thereon a projection strip coincident with the sound groove, a reinforcing layer is formed over the surface metal layer and its reinforcing layer are peeled off from the lacquer master along the boundary therebetween to provide the record matrix.

14 Claims, 11 Drawing Figures

METHOD OF MANUFACTUREING A RECORD MATRIX

BACKGROUND OF THE INVENTION

1. Field of the Invention

The present invention relates generally to manufacturing of record discs, and more particularly is directed to a method of manufacturing a record matrix from a lacquer master.

2. Description of the Prior Art

In the art of producing phonograph record discs, at first, a lacquer master having a sound groove is prepared, a record matrix having a projection strip corresponding to, or coincident with the sound groove of the lacquer master is prepared from the lacquer master and a record disc is molded by the record matrix. When a large number of record discs are to be molded, a mother is provided from the record matrix which is a first record matrix, then one or more metal stampers or second matrices each having the above projection strip are prepared from the mother, and a number of record discs are manufactured from each stamper. In a known method for manufacturing the record matrix from the lacquer master, a surface metal layer of nickel is formed, by electro-less plating, on the surface of the lacquer master having the sound groove therein so that the surface metal layer is formed with a projecting strip corresponding to the sound groove; whereupon, the reinforcing layer, for example, of nickel, is electro-plated over the surface metal layer and, thereafter, the reinforcing layer together with the surface metal layer are peeled or separated from the lacquer master to form the record matrix.

In a known method for the electro-less plating of nickel, for example, for forming the surface metal layer on the lacquer master in the above described procedure for producing a record matrix, the surface to be plated is first degreased by rinsing with a neutral washing agent and then washed with water prior to being subjected to a so-called anchoring treatment by immersion in a chromic acid mixture for 30 seconds. Following such anchoring treatment which forms fine concave and convex portions on the surface to be plated, the lacquer master is again washed with water and then immersed for three minutes in a stannous chloride bath and in a palladium chloride bath for increasing the sensitivity and activity of the surface to be plated. Thereafter, a metal salt solution containing approximately 0.19 mol/l of nickel sulfate and 0.95 mol/l of ammonium chloride and a reduction solution containing 0.05 mol/l of sodium borohydride are sprayed together with inert and reducing gases against the surface to be plated.

By reason of the so-called anchoring treatment included in the above disclosed electro-less plating method, the plated nickel layer that results from the sprayed metal salt and reduction solutions will mesh with the above mentioned fine concave and convex portions and hence the adhesion of the plated layer to the lacquer master surface is strengthened. The above anchoring treatment, however, requires much work and, when electric power is applied to the electro-less plated layer, for example, when effecting further nickel electro-plating on the electro-less plated layer to provide a reinforcing layer, some peeling-off portions or scabs are formed in the plated layer. In other words, in the above prior art method, the anchoring treatment is required to ensure adequate deposit of the electro-less plated nickel layer on the surface of the lacquer master but the resulting electro-less-plated layer has surface irregularities corresponding to the fine concave and convex portions formed by the anchoring treatment and, as a result thereof, in the course of a subsequent electro-plating of nickel on the electro-less-plated layer, scabs, projections, cracks or peeling-off portions are generated and these are fatal defects in manufacturing a record matrix. Moreover, the chromic acid mixture used for the anchoring treatment is a noxious source of pollution which it is difficult to control.

OBJECTS AND SUMMARY OF THE INVENTION

An object of the invention is to provide a method of manufacturing a record matrix from a lacquer master which avoids the above described problems associated with the earlier known methods for that purpose.

Another object is to provide a method of manufacturing a record matrix with a projection strip which is made to correspond to, or be coincident with a sound groove in a surface of the lacquer master with high fidelity and with good reproducibility.

According to an aspect of the invention, in manufacturing a record matrix, a basic reduction solution containing borohydride compound and an acidic metal salt solution containing nickel salt, ammonium salt and lactic acid are sprayed on the surface of the lacquer master which has a sound groove therein, so that the lacquer master is thereby subjected to an electro-less plating of nickel to form a surface metal layer having on one surface thereof a projection strip coincident with the sound groove, whereupon, a reinforcing layer is formed, as by electro-plating, over the surface metal layer and thereafter the surface metal layer and the reinforcing layer are peeled off the lacquer master at the boundary surface therebetween to provide a record matrix.

The above, and other objects, features and advantages of the present invention, will be clear from the following description which is to be read in conjunction with the accompanying drawings.

DESCRIPTION OF THE PREFERRED EMBODIMENTS

Figure 1:
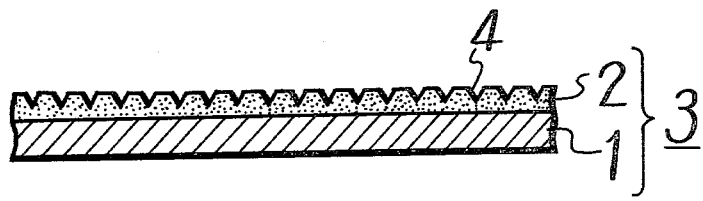
FIGS. 1 to 8, inclusive, are fragmentary, enlarged cross-sectional views to which reference will be made in explaining the steps of the method of manufacturing a record matrix according to the present invention.

Referring to the drawings in detail, and initially to FIG. 1 thereof, it will be seen that the manufacture of record discs starts with a metal base plate 1 on which there is coated a lacquer layer 2. A sound groove 4 corresponding to an original sound is formed in the exposed surface of lacquer layer 2 to a depth of about 50$\mu$(micron) to form a lacquer master 3.

Figure 2:
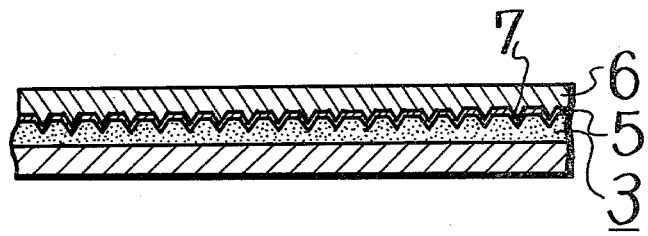

Next, as shown in FIG. 2, nickel Ni is electroless-plated over layer 2 of lacquer master 3 to form thereon a surface metal layer 5 of a thickness of about several microns and which will eventually become a surface material on a first record matrix or master. Nickel Ni, cobalt Co or copper Cu is then electro-plated on the surface metal layer 5 to form a reinforcing layer 6 which determines the strength of the eventual record matrix.

Figure 3:
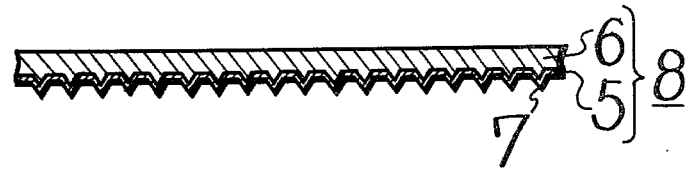

Then, as shown in FIG. 3, metal layer 5 and reinforcing layer 6 are together peeled from the lacquer layer 2 at the boundary surface between metal layer 5 and lacquer layer 2 to provide the first matrix 8 consisting of the reinforcing layer 6 and the surface metal layer 5 and in which a projection strip 7 corresponding to or coincident with sound groove 4 on lacquer master 3 extends from surface metal layer 5.

Figure 4:
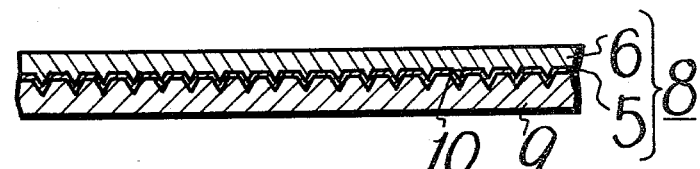

A record disc can be molded directed from this first matrix 8. However, when a substantial number of record discs are to be molded, at least one second matrix is made from the first matrix 8 and a number of record discs are then molded from each second matrix. To this end, the first matrix 8 is used as a metal master and the surface thereof having the projection strip 7 extending therefrom is subjected to an oxidation treatment. The resulting oxide layer, which facilitates the peeling off from the surface, is thin and has a certain degree of conductivity. Thereafter, a metal layer 9 is formed by electro-plating on the oxidized surface of the matrix 8 having a projection strip 7, as shown in FIG. 4. This metal layer 9 is formed by electro-plating nickel alone to a predetermined thickness, or by copper plating on a relatively thin layer of electro-plated nickel.

Figure 5:

Next, the metal layer 9 is peeled off from matrix 8 at the peelable oxide layer, thereby to form a metal mother 11 which, as shown on FIG. 5, has a sound groove 10 corresponding to the projection strip 7.

Figure 6:
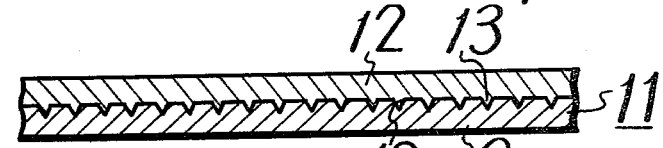

Then, the surface of metal mother 11 having sound groove 10 therein is subjected to an oxidation treatment, and the resulting oxide layer facilitates the peeling off from the metal mother 11. In this case, the oxidation treatment is carried out so that the surface of the metal mother 11 has a certain degree of conductivity. A metal layer 12, for example, of nickel, is electro-plated on the surface of the metal mother 11 having a sound groove 10, and on which the peelable oxide layer has been formed, as shown in FIG. 6.

Figure 7:
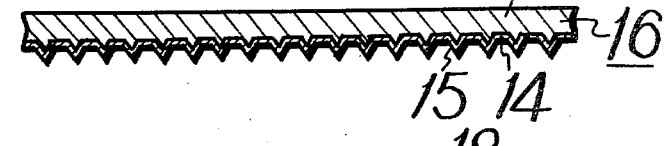

The metal layer 12 is peeled off from the metal mother 11, and is chrome-plated on the peeled-off surface of metal layer 12 to form a surface metal layer 14 thereon. Thus, as shown in FIG. 7, a metal stamper 16 is formed as the second matrix which has a projection strip 15 corresponding to or coincident with the sound groove 10.

Figure 8:

Finally, a record disc 17 may be heat-compression-molded by the metal stamper 16 as shown in FIG. 8. The record disc 17 thus produced has a sound groove 18 corresponding to, or coincident with the projection strip 15 and corresponding to the groove 4 originally formed in the lacquer master 3.

According to the present invention, the electro-less plating of nickel on lacquer layer 2 for forming the surface metal layer 5 of the first matrix 8, is carried out by the following method:

In order to electro-less-plate the lacquer master 3 with nickel, a reduction solution and acidic metal salt solution, which have been previously prepared separately, are simultaneously sprayed on the lacquer master 3 and are mixed with each other on the lacquer master 3 or near the surface thereof to deposit a nickel layer on the lacquer master 3. The lacquer layer 2 is pre-treated before its electro-less plating and this pre-treatment can also be carried out by a spraying method. In such pre-treatment, the surface of lacquer layer 2 on lacquer master 3 is degreased by rinsing with a weak alkali rinsing agent. Thereafter, the surface of lacquer layer 2 is subjected to a sensitivity treatment and then to activation treatment, prior to the spraying thereagainst of the reduction solution and nickel or metal salt solution.

The reduction solution desirably contains a borohydride compound, for example, 0.015 to 0.03 mol/l of $NaBH_4$, and its pH is adjusted to be 10.5 to 11.5 by, for example, 0.01 to 0.1 mol/l of ammonia. The nickel salt solution may desirably contain 0.02 to 0.04 mol/l of nickel salt, 0.02 to 0.04 mol/l of ammonium salt and 0.02 to 0.07 mol/l of lactic acid, and in some instances also 0.01 to 0.06 mol/l of boric acid, and its pH is selected to be 2.0 to 3.0. The foregoing reduction solution and metal salt solution are respectively sprayed from nozzles on the surface to be plated under conditions such that the flow rate of nickel salt solution sprayed on the lacquer layer is 10 to 1000 ml/sec.m$^2$ and the mixing ratio of the reduction solution and the nickel salt solution is from 2:1 to 1:2. The nickel is deposited on the surface to be plated at a plating temperature of 5° C. to 40° C., and to a thickness of 0.01 to 0.5 $\mu$m.

The nickel salt used as in metal salt solution may be selected from nickel acetate, nickel iodide, nickel nitrate, nickel sulfate and so on.

The ammonium salt may be selected from ammonium acetate, ammonium bromide, ammonium carbamate, ammonium carbonate, ammonium chloride, ammonium citrate, ammonium dihydrogenphosphate, ammonium hydrogencarbonate carbamate, ammonium hydrogencarbonate, ammonium hydrogenphosphite, ammonium hydrogensulfate, ammonium iodate, ammonium iodide, ammonium metaborate, ammonium nitrate, ammonium oxalate, ammonium peroxodisulfate, ammonium phosphate, ammonium sodium hydrogenphosphate, ammonium amidosulfate, ammonium sulfate, ammonium sulfite, ammonium thiocyanate, ammonium thiosulfate and so on.

In the lacquer master 3 to be plated, the base plate 1 may be of smooth aluminum plate, and the lacquer layer 2 preferably has a thickness of 0.1 to 0.3 mm and is composed of a resin, mainly of nitrocellulose, with plasticizer added thereto. In this case, the weight ratio between the resin and the plasticizer is in the range between 75:25 and 55:45. The nitrocellulose is preferably a polymer material which is obtained as the dehydration condensate of glucose having three hydroxyl groups at the glucose anhydride unit of cellulose and being suitably modified by a nitration reaction. It is desired that a mean value of 1.5 to 2.8, and preferably of 1.9 to 2.5 of the three hydroxyl groups at the glucose anhydride unit are nitrated. The degree of polymerization represented as the number in one molecule of the glucose anhydride unit is desired to be 45 to 70. The above described resin consists mainly of nitrocellulose, but other resins, such as natural resins, for example, shellac, rosin, copal, dammer or the like, can be used in an amount no greater than 20 percent, by weight, of the total resin. Further, the plasticizer may be selected from among the phthalate plasticizers, for example, dibutyl phthalate, dicyclohexyl phthalate, dioctyl phthalate and so on, or from among the castor oil plasticizers, for example, castor oil, blown caster oil, castor oil modified alkyd resin and so on.

Several specific examples of the electro-less plating of nickel on the above lacquer master in accordance with this invention will now be described:

EXAMPLE 1

The lacquer master 3 is rinsed with a weak alkaline washing liquid to remove grease from the surface of the lacquer master.

Next, the degreased surface of the lacquer layer 2 is sensitized by spraying with a solution having the following composition.

Composition of Sensitizing Solution

| $SnCl_2 \cdot 2 H_2O$ | 0.2 mol/l |
|---|---|
| HCl | 0.12 mol/l |

Then the sensitized surface to be plated is activated by spraying with a solution having the following composition.

Composition of Activating Solution

| $PdCl_2$ | 0.0003 mol/l |
|---|---|
| HCl | 0.12 mol/l |

The surface, which has been treated as above, is then sprayed with a reduction solution and a nickel metal salt solution having the below compositions under such conditions that the solutions are mixed with each other at room temperature and in equal amounts immediately before encountering the surface to be plated.

Composition of Reduction Solution:

| $NaBH_4$ | 0.023 mol/l | |
|---|---|---|
| pH | 10.5 to 11.5 | (which is adjusted by ammonia) |

Composition of Nickel Metal Salt Solution:

| $NiSO_4 \cdot 6 H_2O$ | 0.024 mol/l |
|---|---|
| $(NH_4)_2 SO_4$ | 0.020 mol/l |
| $CH_3CH(OH)COOH$ | 0.04 mol/l |
| $H_3BO_3$ | 0.034 mol/l |
| pH | 2.0 to 3.0 |

When the above treatments are carried out, on the surface of the lacquer layer 2 contacted by the nickel electro-less plating liquid, that is, the mixture of the above reduction solution and metal salt solution, there is deposited a nickel layer.

EXAMPLE 2

The lacquer master 3 is rinsed with a weak alkaline washing liquid to remove grease therefrom.

The degreased surface of the lacquer master 3 by spraying with the below solution:

Composition of Sensitizing Solution

| $SnCl_2 \cdot 2 H_2O$ | 0.25 mol/l |
|---|---|
| HCl | 0.19 mol/l |

A reduction solution and a nickel metal salt solution having the below compositions are sprayed on the surface to be plated which has been subjected to the above treatments under conditions which are the same as in Example 1:

Composition of Reduction Solution

| $NaBH_4$ | 0.015 mol/l | |
|---|---|---|
| pH | 10.5 to 11.5 | (which is adjusted by ammonia) |

Composition of Nickel Metal Salt Solution

| $NiSO_4 \cdot 6 H_2O$ | 0.02 mol/l |
|---|---|
| $(NH_4)_2 SO_4$ | 0.04 mol/l |
| $CH_3CH(OH)COOH$ | 0.07 mol/l |
| $H_3BO_3$ | 0.01 mol/l |
| pH | 2.0 to 3.0 |

When the above treatments are carried out, there is chemically deposited a nickel layer on the surface of lacquer layer 2 by the contact therewith of the nickel electro-less plating liquid, that is, the mixture of the above reduction solution and metal salt solution.

EXAMPLE 3

The lacquer master 3 is subjected to treatments similar to those of Example 1 for degreasing and for sensitizing and activating. Thereafter, a reduction solution and a nickel metal salt solution, which have the below compositions, are sprayed on the surface to be plated in a manner similar to that of Example 1 to form a nickel layer thereon.

Composition of Reduction Solution

| $NaBH_4$ | 0.015 mol/l | |
|---|---|---|
| pH | 10.5 to 11.5 | (which is adjusted by ammonia) |

Composition of Nickel Metal Salt Solution

| $NiSO_4 \cdot 6 H_2O$ | 0.03 mol/l |
|---|---|
| $NH_4Cl$ | 0.035 mol/l |
| $CH_3CH(OH)COOH$ | 0.06 mol/l |
| $H_3BO_3$ | 0.02 mol/l |
| pH | 2.0 to 3.0 |

EXAMPLE 4

The lacquer master 3 is subjected to treatments similar to those of Example 1 for degreasing and for sensitizing and activating. Thereafter, a reduction solution and a nickel metal salt solution, which have the below positions, are sprayed on the surface to be plated in the manner similar to that of Example 1 to form a nickel layer thereon.

Composition of Reduction Solution

| $NaBH_4$ | 0.025 mol/l | |
|---|---|---|
| pH | 10.5 to 11.5 | (which is adjusted by ammonia) |

Composition of Nickel Metal Salt Solution

| $NiCl_2 \cdot 6 H_2O$ | 0.04 mol/l |
|---|---|
| $(NH_4)_2 SO_4$ | 0.02 mol/l |
| $CH_3CH(OH)COOH$ | 0.02 mol/l |
| $H_3BO_3$ | 0.015 mol/l |

| | -continued | |
|---|---|---|
| pH | 2.0 to 3.0 | |

EXAMPLE 5

The lacquer master 3 is subjected to treatments similar to those of Example 1 for degreasing and for sensitizing and activating. Thereafter, a reduction solution and a nickel metal salt solution, which have the below compositions, are sprayed on the surface to be plated in the manner similar to that of Example 1 to form a nickel layer thereon.

Composition of Reduction Solution

| Na BH$_4$ | 0.03 mol/l | |
|---|---|---|
| pH | 10.5 to 11.5 | (which is adjusted by ammonia) |

Composition of Nickel Metal Salt Solution

| NiCl$_2 \cdot$ 6 H$_2$O | 0.05 mol/l |
|---|---|
| NH$_4$Cl | 0.03 mol/l |
| CH$_3$CH(OH) COOH | 0.06 mol/l |
| H$_3$BO$_3$ | 0.06 mol/l |
| pH | 2.0 to 3.0 |

EXAMPLE 6

The lacquer master 3 is subjected to treatments similar to those of Example 1 for degreasing and for sensitizing and activating. Thereafter, a reduction solution and a nickel metal salt solution, which have the below compositions, are sprayed on the surface to be plated in the manner similar to that of Example 1 to form a nickel layer thereon.

Composition of Reduction Solution

| Na BH$_4$ | 0.02 mol/l | |
|---|---|---|
| pH | 10.5 to 11.5 | (which is adjusted by ammonia) |

Composition of Nickel Metal Salt Solution

| Ni(NO$_3$)$_2 \cdot$ 6 H$_2$O | 0.035 mol/l |
|---|---|
| NH$_4$Cl | 0.025 mol/l |
| CH$_3$CH(OH) COOH | 0.05 mol/l |
| H$_3$BO$_3$ | 0.05 mol/l |
| pH | 2.0 to 3.0 |

The nickel plated layer of each of the above Examples can be formed at a high reaction speed without any skip and also with a thickness, for example, of 0.1 μm, which is sufficient to obtain the conductivity necessary for thereafter effecting electro-plating thereon. Further, the plated surface is high in uniformity and, when electro-plating is carried out over the electro-less nickel plated surface, no cracks or scabs are produced.

The reason why the electro-less-plated nickel layer according to this invention has good adhesion and other properties is that the stresses produced in the plated layer are reduced and the strength of the plated layer itself is improved by the addition of the lactic acid, that is, CH$_3$CH(OH) COOH, to the nickel metal salt solution. Further, by the addition of lactic acid, the reaction speed can be made high and hydrogen gas and so on can be prevented from being trapped in the plated layer.

Figure 9:
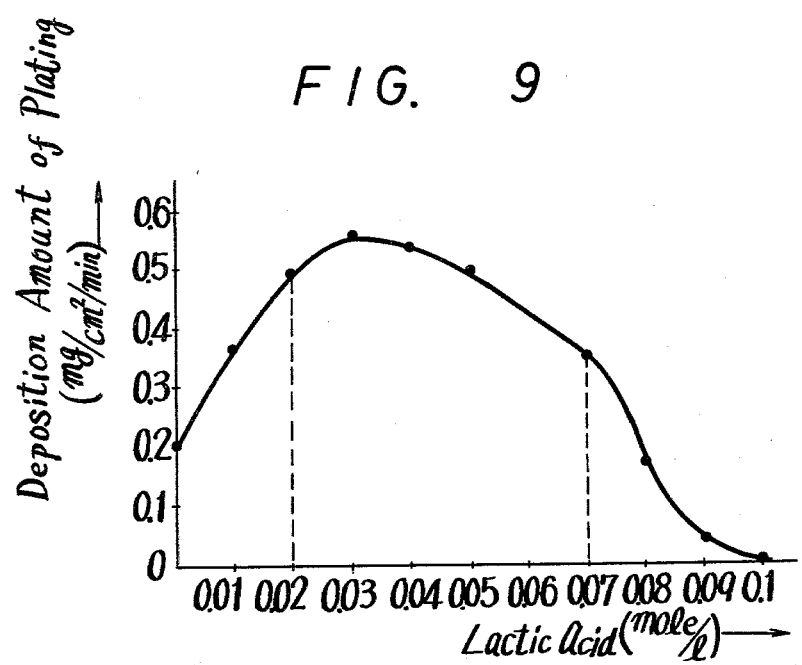
FIGS. 9 to 11, inclusive, are graphs showing the rate of deposition of nickel, the electrical resistance of the deposited nickel layer and the tensile stress thereof, respectively, for varying amounts of lactic acid included in the acidic metal salt solution used in the electro-less plating step according to this invention.

FIG. 9 is a graph showing the measured relation between the plating speed and varying amounts of lactic acid when using a method which is otherwise the same as Example 1. From this graph it is clear that, when the amount of the added lactic acid is 0.03 mol/l, the rate of deposition of nickel is at a maximum. However, even if the rate of deposition is a little lower than the maximum value, the reduced stress in the deposited layer that results from increased amounts of lactic acid is desirable. Therefore, the lactic acid can be added in amounts more than 0.03 mol/l. However, when the added amount of lactic acid exceeds 0.07 mol/l, the reaction speed of the plating solution becomes too high with the result that the reduction solution and nickel metal salt solution react with each other before they arrive at the surface to be plated and hence the deposited amount of nickel on the surface becomes too low. When the added amount of lactic acid is lower than about 0.02 mol/l, the reaction speed of the plating solution is low. Therefore, even if the nickel salt solution is mixed with the reduction solution, the mixed solutions flow off the surface of lacquer layer 2 before nickel is deposited and, therefore, the amount of nickel deposited is low.

Figure 10:
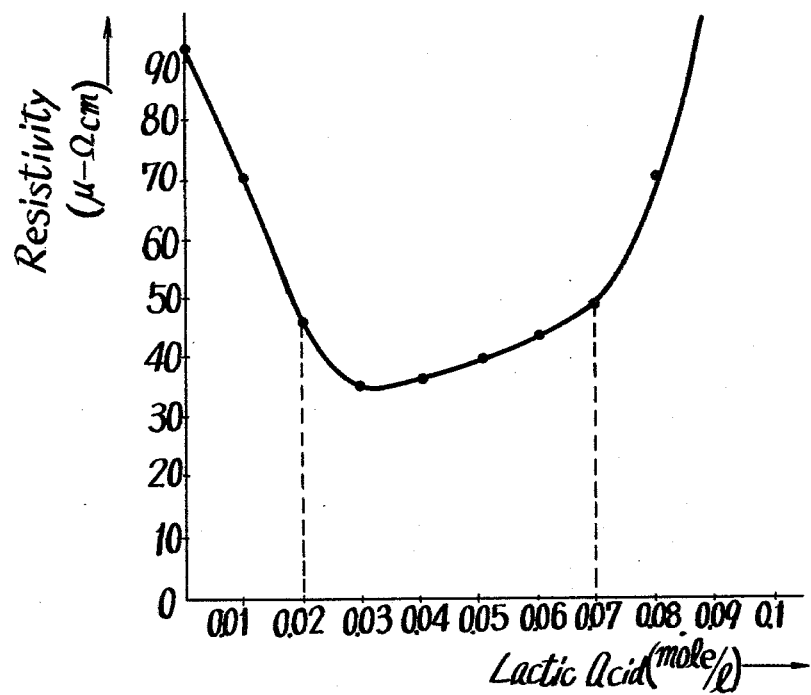

FIG. 10 is a graph showing the relation between the electrical resistance of the deposited nickel layer and the amount of lactic acid added to the nickel metal salt solution in the method of Example 1. From the graph of FIG. 10, it will be understood that when the rate of deposition of nickel is high, the resistance value of the resulting nickel layer is desirably low.

Figure 11:
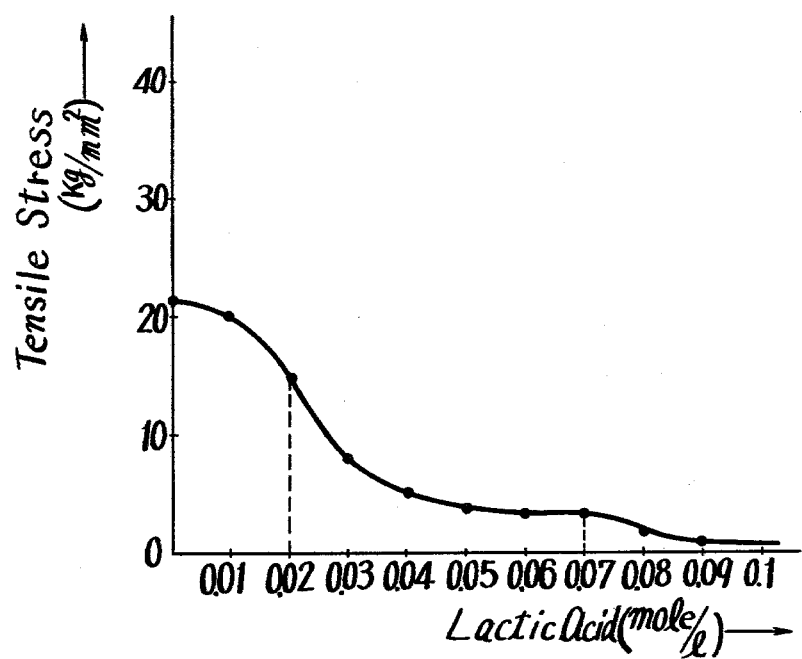

FIG. 11 is a graph showing the relation between the amount of lactic acid added to the nickel metal salt solution and the tensile stress of the nickel plated layer deposited by the method of Example 1. The measurement of tensile stress is carried out by the spiral stress meter. From the graph of FIG. 11, it will be apparent that, as the amount of lactic acid increases, the tensile stress is reduced. When no lactic acid is added, as in the prior art, cracks and scabs are produced in the plated nickel layer in response to applying electric power thereto, as when electro-plating is effected over the electro-less plated layer. The reason for the foregoing may be that the tensile stress of the nickel plated layer with no lactic acid is high.

From the graphs of FIGS. 9 to 11, it will be understood that, if the amount of lactic acid added to the plating liquid, and particularly to the nickel metal salt solution, is selected to be within the range from approximately 0.02 mol/l to 0.07 mol/l, the resulting plated nickel layer is superior in its tensile stress.

It has further been ascertained that, when 0.01 to 0.06 mol/l of boric acid is added to the nickel metal salt solution as in the foregoing examples, the solution becomes stable and the uniform deposition of nickel is improved. The added amount of boric acid is selected to be from 0.01 to 0.06 mol/l because, when the amount is less than 0.01 mol/l almost no effect is achieved by the addition of boric acid, whereas, when the amount exceeds 0.06 mol/l, the boric acid is apt to be deposited or precipitated from the solution.

The flow rate of the nickel metal salt solution, as the latter is being sprayed, is selected to be from approximately 10 to 1000 ml/sec.m$^2$ because, when the spraying or flow rate is less than 10 ml/sec.m$^2$, the plating requires too much time and cavities are likely to be produced between the plated layer and the surface to be plated, whereas, when the spraying or flow rate exceeds 1000 ml/sec.m$^2$, the plating solution becomes superfluous and cavities containing hydrogen gas are likely to be produced in the plated layer.

It will be appreciated that, in the electro-less plating according to the present invention, since the reduction solution and the nickel salt solution are mixed just before impingement on the surface of the lacquer master to be plated, the lacquer master is always sprayed with clean plating solution and, hence, a nickel layer of good quality can be formed on the surface of the lacquer master. Further, the reduction and nickel salt solutions are kept separate from each other until being sprayed, so that they can be stored for a long time. Dirt, dust or the like in the sound groove of the lacquer master is removed by the spraying of the solutions thereagainst, and hydrogen gas generated by the reaction can be effectively made to flow away. Therefore, the deposited plated nickel layer is superior in quality.

Since in the electro-less plating according to the present invention it is unnecessary to carry out the anchoring treatment with chromic acid mixture, as in the electro-less plating of nickel according to the prior art, therein no deterioration of the fidelity of the sound groove due to the concave and convex portions caused by such anchoring treatment. Further, due to the omission of the anchoring treatment, the process is not only simplified, but also pollution inherent in practicing the anchoring treatment can be avoided.

As is apparent from the above, the record matrix 8 or the metal stamper 16 obtained with the method according to the present invention is free from the concave and convex portions which are caused by the anchoring pre-treatment of the prior art and the formation of scabs and so on can be avoided so that record discs of high fidelity and which are noise free can be manufactured.

Although specific examples of the method of electroless plating according to this invention have been given herein, it will be apparent that the invention is not limited to those precise examples, and that many modifications and variations could be effected therein by one skilled in the art without departing from the spirit of scope of the invention as defined in the appended claims.

What is claimed is:

1. A method of manufacturing a record matrix comprising the steps of:
    preparing a lacquer layer with a sound groove therein;
    jointly spraying against said lacquer layer a reduction solution which contains 0.015 to 0.03 mol/l of borohydride compound and has a pH value from 10.5 to 11.5, and a metal salt solution which contains 0.02 to 0.04 mol/l of nickel salt, 0.02 to 0.04 mol/l of ammonium salt and 0.02 to 0.07 mol/l of lactic acid and has a pH value from 2.0 to 3.0 to effect electro-less plating of nickel on said lacquer layer and hence to form a surface metal layer having a projection strip extending therefrom corresponding to said sound groove in said lacquer layer;
    forming a reinforcing layer over said surface metal layer; and
    peeling said reinforcing layer together with said surface metal layer from said lacquer layer along the boundary surface therebetween.

2. The method of manufacturing a record matrix according to claim 1; wherein the ratio of said metal salt solution and said reduction solution, as sprayed against said lacquer layer, is within the range of 2:1 to 1:2.

3. The method of manufacturing a record matrix according to claim 1; wherein said metal salt solution is sprayed at a flow rate of 10 to 1000 ml/sec.m$^2$.

4. The method of manufacturing a record matrix according to claim 1; wherein said electro-less plating is effected at a temperature in the range of 5° C. to 40° C.

5. The method of manufacturing a record disc according to claim 1; wherein said metal salt solution further contains 0.01 to 0.06 mol/l of boric acid.

6. The method of manufacturing a record matrix according to claim 1; wherein the ratio of said metal salt solution and said reduction solution, as sprayed against said lacquer layer, is within the range of 2:1 to 1:2; and said metal salt solution is sprayed at a flow rate of 10 to 1000 ml/sec.m$^2$.

7. The method of manufacturing a record matrix according to claim 6; wherein said electro-less plating is effected at a temperature in the range of 5° C. to 40° C., and said metal salt solution further contains 0.01 to 0.06 mol/l of boric acid.

8. The method of manufacturing a record matrix according to claim 1; in which said nickel salt is selected from the group consisting of nickel acetate, nickel iodide, nickel nitrate and nickel sulfate, and said ammonium salt is selected from the group consisting of ammonium acetate, ammonium bromide, ammonium carbamate, ammonium carbonate, ammonium chloride, ammonium citrate, ammonium dihydrogenphosphate, ammonium hydrogencarbonate carbamate, ammonium hydrogencarbonate, ammonium hydrogenphosphite, ammonium hydrogensulfate, ammonium iodate, ammonium iodide, ammonium metaborate, ammonium nitrate, ammonium oxalate, ammonium peroxodisulfate, ammonium phosphate, ammonium sodium hydrogenphosphate, ammonium amidosulfate, ammonium sulfate, ammonium sulfite, ammonium thiocyanate and ammonium thiosulfate.

9. In the method of electro-less plating of a nickel surface layer on the lacquer layer of a lacquer master to permit the electro-plating thereon of a reinforcing layer which, when stripped from the lacquer layer along with the nickel surface layer, forms a record matrix, and in which said electro-less plating is effected by jointly spraying against the lacquer layer a reduction solution and a nickel metal salt solution; the improvement of including in said nickel metal salt solution from 0.02 to 0.07 mol/l of lactic acid.

10. The method of claim 9; in which said reduction solution contains 0.015 to 0.03 mol/l of borohydride compound and has a pH value from 10.5 to 11.5; and said nickel metal salt solution further contains 0.02 to 0.04 mol/l of nickel salt, and 0.02 to 0.04 mol/l of ammonium salt, and has a pH value from 2.0 to 3.0.

11. The method of claim 10; wherein the ratio of said metal salt solution and said reduction solution, as sprayed against said lacquer layer, is within the range of 2:1 to 1:2.

12. The method of claim 10; wherein said metal salt solution is sprayed at a flow rate of 10 to 1000 ml/sec.m$^2$.

13. The method of claim 10; wherein said electro-less plating is effected at a temperature in the range of 5° C. to 40° C.

14. The method of claim 10; wherein said metal salt solution further contains 0.01 to 0.06 mol/l of boric acid.

* * * * *